United States Patent
White

[15] 3,654,683
[45] Apr. 11, 1972

[54] METHOD OF CONSTRUCTING A BALL TYPE BEARING

[72] Inventor: Charles S. White, Route 3, P.O. Box 454-H, Palmdale, Calif. 93550

[22] Filed: Sept. 28, 1970

[21] Appl. No.: 76,109

[52] U.S. Cl.............................29/149.5 B, 29/424, 308/72
[51] Int. Cl...................B23p 11/00, B23p 17/00, F16c 9/06
[58] Field of Search.......................29/149.5 B, 149.5 R, 424; 308/241, 72

[56] References Cited

UNITED STATES PATENTS

| | | | |
|---|---|---|---|
| 224,541 | 2/1880 | Jackman et al. | 29/149.5 R |
| 2,947,063 | 8/1960 | Teeple, Jr. | 29/149.5 B |

*Primary Examiner*—Thomas H. Eager
*Attorney*—Harness, Dickey & Pierce

[57] ABSTRACT

The method of constructing a bearing such as a ball for a rod end or a ball stud, for examples, has layers built up thereon from a dipping, or plating and/or spraying process. The ball has a highly polished surface which is treated to have little or no adhesion with a metal layer plated thereon. The first layer of lead, tin or the like is plated on the ball surface with a minimum adhesion therebetween. On this first layer is plated a bearing metal such as silver, nickel, bronze and the like which adheres thereto. A housing is built up on the second layers by a plating or spraying process and the adherred layers are freed from the ball surface by a very light breakaway force. A predetermined clearance is obtained between the bearing metal and ball surface when the first layer is eroded away.

6 Claims, 4 Drawing Figures

PATENTED APR 11 1972 3,654,683
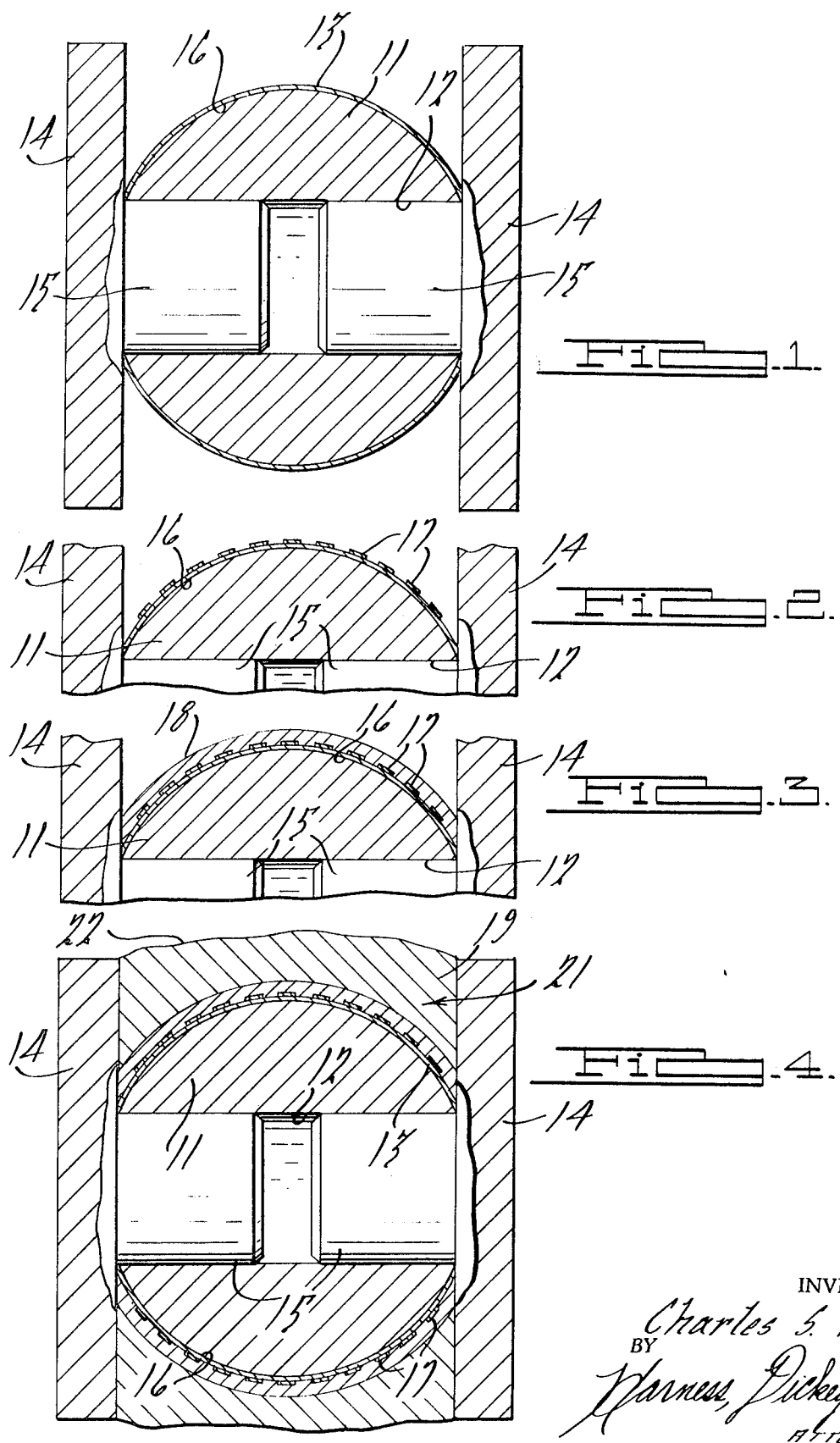

METHOD OF CONSTRUCTING A BALL TYPE BEARING

SUMMARY OF THE INVENTION

The invention pertains to a bearing which is made by a continuous process of dipping, plating, spraying or a combination thereof to provide layers of metal on the polished surface of the bearing element. The element herein illustrated, by way of example, is a ball of a rod end which has a thin first layer of metal applied thereon in a manner to have a minimum bond therebetween. This metal may be lead, tin or the like on which a second and thicker layer of a bearing metal is applied such as silver, nickel, bronze and the like. Between these layers a graphic grid or spaced dots of graphite or like lubricating material may be applied by the photographic, rolling or other process. Upon the bearing layer a housing is built up by the plating or spraying process which deposits a layer of iron, nickel or like metal in bonded relation to the silver layer. The housing, bearing and first layers are bonded together and the first layer readily separated from the ball with a minimum breakaway force. The metal of the first layer will erode away and be substantially eliminated after initial wear. With the elimination of the first layer, which is of predetermined thickness, a desired clearance will be provided between the polished ball surface and the layer of bearing material.

BRIEF DESCRIPTION OF THE DRAWINGS

FIG. 1 is a sectional view of a ball for a rod end with insulating elements on the ends and with a thin layer of metal on the exposed surface;

FIG. 2 is a broken view of the structure illustrated in FIG. 1, with a broken second layer of a lubricating material applied to the first layer;

FIG. 3 is a view of the structure illustrated in FIG. 2, with a third layer of bearing metal plated on the first two layers, and FIG. 4 is a view of the structure illustrated in FIG. 3, with a housing constructed from a fourth layer of material built up upon the third layer by the plating or a spraying process.

DESCRIPTION OF THE PREFERRED EMBODIMENT

In the Figures, a ball 11 is illustrated having a central aperture 12 with a thin layer of metal 13 on the truncated spherical ball surface. Insulating elements 14 have bosses 15 at the center which are inserted in the ends of the aperture for securing the elements 14 on the ball. The exposed truncated spherical surface 16 of the ball is highly polished and otherwise treated to permit the dipping or plating of the thin layer 13 thereon with a minimum bond between the layer and the surface 16. The metal is lead, tin or the like and the layer is thin so that when worn away or otherwise removed, a desired clearance is provided between a bearing layer and the ball surface.

In FIG. 2, a broken second layer 17 is illustrated of graphite or the like which is applied by a rolling, photographic or other process with the layer applied as dots, a grid or random broken patterns. This layer may be omitted and, as illustrated in FIG. 3, the third layer 18 is plated onto the first layer 13 and when the second layer 17 is employed it is plated on both layers 13 and 17. The third layer 18 is plated from a metal having good bearing properties, such as silver, nickel, bronze and the like. This is a substantially heavier layer than the first thin layer 13.

A fourth layer 19 is applied by a plating, spraying or like process to build up a housing 21 about the ball with the bearing layer 18 permanently fixed thereto. The insulating elements 14 are removed and the outer rough portion 22 of the layer 19 is machined to provide a desired diameter and a cylindrical form to the housing. The ball 11 is readily broken from the layer 13 and the metal thereof will erode away as the ball moves within the housing 21 to provide a bearing contact between the layer 18 and the surface 16 of the ball 11 with a predetermined clearance therebetween.

When the interrupted areas of the graphite forming the second layer 17 is present, this material will act as a lubricant confined by the third layer in engagement with the ball surface. As pointed out above, the clearance between the bearing layer 18 and the surface of the ball is regulated by the thickness of the layer 13 first applied thereto. The ball and housing can be made in a continuous process one in which the ball will be passed into a plating tank to have the layer 13 applied thereto from which it will pass to a second plating tank where the bearing metal is applied to the first layer 13 from which it will pass to a third plating tank where the housing 21 is plated to the bearing metal. This is a continuous process regulated by the length of time that the ball is retained in the tanks as it passes from one tank through the other tanks. The housing is preferably plated from nickel, iron and like materials and in some instances the housing layer could be sprayed upon the bearing layer 18 rather than being plated thereon. With this process, the ball and housing unit is cheap to construct with an exact clearance provided between the bearing layer 18 and the ball surface 16. By employing lead, tin and the like for the first lSyHr, t:HBe will be no babchmf or scoring between the bearing layer and the surface of the ball as it erodes during the initial short time of operation. Since the bearing is constructed to withstand heat during operation, it is within the purview of the invention to heat the bearing to melt the lead, tin or like metal of the first layer to remove it from the bearing layer surface to initially provide clearance. When a lubricant is desirable, the second layer 17 will be applied to the first layer in the manner pointed out hereinabove between the plating of the layers 13 and 17. Should this layer deteriorate, the face of the bearing layer 18 will remain broken into individual areas which will retain a lubricant when applied to the ball assembly.

I claim:

1. The method of forming a ball unit which includes the steps of: applying a thin layer of metal or the like on the ball surface with a minimum of adhesion therebetween, plating a heavier layer of good bearing material on said first layer, and building up a housing on said second layer with the layers and housing bonded to each other, and wearing away or otherwise removing the first layer to provide a predetermined clearance between the ball surface and the second layer.

2. In the method as recited in claim 1, wherein an interrupted layer of a material having lubricating properties is applied between the first and second layers.

3. In the method as recited in claim 1, wherein the first layer is composed of a metal such as lead, tin and the like.

4. In the method as recited in claim 3, wherein the second layer is of silver, nickel, bronze and the like having good bearing qualities.

5. In the method as recited in claim 3, wherein a broken layer is applied to the first layer before the second layer is plated, said broken layer being composed of graphite or like lubricant.

6. In the method as recited in claim 5, wherein the housing is built up from iron, nickel and like platable or sprayable metals.

* * * * *